US012583576B2

(12) United States Patent
Kim et al.

(10) Patent No.: US 12,583,576 B2
(45) Date of Patent: Mar. 24, 2026

(54) DEVICE FOR ADJUSTING CENTER OF GRAVITY

(71) Applicants: Hyundai Motor Company, Seoul (KR); Kia Corporation, Seoul (KR)

(72) Inventors: Choung Hyoung Kim, Anyang-si (KR); Woo Suk Jung, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 244 days.

(21) Appl. No.: 18/240,181

(22) Filed: Aug. 30, 2023

(65) Prior Publication Data

US 2024/0375769 A1 Nov. 14, 2024

(30) Foreign Application Priority Data

May 10, 2023 (KR) ........................ 10-2023-0060644

(51) Int. Cl.
B64C 17/02 (2006.01)
B64D 9/00 (2006.01)
G01M 1/12 (2006.01)
(52) U.S. Cl.
CPC ............... B64C 17/02 (2013.01); B64D 9/00 (2013.01); G01M 1/125 (2013.01)
(58) Field of Classification Search
None
See application file for complete search history.

(56) References Cited

U.S. PATENT DOCUMENTS 3,545,813 A * 12/1970 Mikio .................... B65G 51/03
414/676
10,543,905 B1 1/2020 Kwon et al.

11,066,168 B2 7/2021 Clos et al.
2001/0028018 A1 10/2001 Darbyshire
2005/0001579 A1 1/2005 Touzov
2016/0101859 A1* 4/2016 Himmelmann ........ B65G 51/03
406/88
2022/0332418 A1 10/2022 Schliwa et al.

FOREIGN PATENT DOCUMENTS

CN 212206317 U 12/2020
EP 3006338 A1 4/2016
EP 3594113 A1 1/2020
JP 2003-527272 A 9/2003
JP 2019-142441 A 8/2019
KR 10-2001-0058824 A 7/2001
KR 10-0950253 A 3/2010

OTHER PUBLICATIONS

Apr. 22, 2024—(EP) Extended European Search Report—App 23206648.0.

* cited by examiner

*Primary Examiner* — William R Harp
(74) *Attorney, Agent, or Firm* — Banner & Witcoff, Ltd.

(57) ABSTRACT

A device for adjusting a center of gravity is provided. The device can measure a change and/or distribution of a load in a vehicle. The device can adjust a center of gravity to ensure control stability and maintain balance in an aircraft. The device may include: a movable plate configured to support cargo in a cargo hold; a plurality of air bearings disposed between the movable plate and a bottom of the cargo hold and configured to support and/or float the movable plate; and a first driving unit installed in the cargo hold and connected to the movable plate. The first driving unit may be configured to move the movable plate, if the movable plate is floated.

20 Claims, 6 Drawing Sheets

DEVICE FOR ADJUSTING CENTER OF GRAVITY

CROSS-REFERENCE TO RELATED APPLICATION(S)

This application claims benefit of priority to Korean Patent Application No. 10-2023-0060644 filed on May 10, 2023, in the Korean Intellectual Property Office, the disclosure of which is incorporated herein by reference in its entirety.

TECHNICAL FIELD

The present disclosure relates to a device for adjusting a center of gravity. In particular, the device is configured to determine and adjust a center of gravity to control stability and/or maintain balance, for example, in an aircraft.

BACKGROUND

If cargo is mounted in an aircraft, a center of gravity of the aircraft is shifted by the center of gravity of the cargo. Matching these centers of gravity is essential for efficient flight and safe flight.

For example, unlike a long-distance trip in which an aircraft travels from a departure point to a destination without much change in cargo, if an aircraft has to travel to several places over relatively short distances to make several changes in cargo and/or passengers, the center of gravity of the aircraft may change depending on unloading and/or loading the cargo at intermediate stops. For the aircraft to safely fly to a destination, the cargo would have to be balanced at each change.

Conventionally, in order to obtain the center of gravity of an aircraft, a method of actually measuring respective loads applied to landing gears to measure a position of the center of gravity, or performing estimation through calculations according to the load and position of fuel, cargo, and passengers is used. Subsequently, the cargo may be distributed in a cargo hold so that the center of gravity for each stage of the aircraft is disposed within an allowable tolerance range.

Accordingly, the distribution of the cargo must be changed for a safe center of gravity whenever the cargo (or other load) is changed, and it is impossible to load or unload the cargo in a short period of time. Accordingly, there may be a problem in that efficient and safe flight cannot be guaranteed.

SUMMARY

The following summary presents a simplified summary of certain features. The summary is not an extensive overview and is not intended to identify key or critical elements.

Systems, devices, and methods are described for adjusting a center of gravity (e.g., of a vehicle). A device may comprise a movable plate configured to support a cargo, wherein the movable plate is spaced apart from a bottom surface of a cargo hold and is movable within the cargo hold; a plurality of air bearings disposed between the movable plate and the bottom surface and configured to support and float the movable plate; and a first driving unit connected to the movable plate, and configured to move the movable plate if the movable plate is floated.

These and other features and advantages are described in greater detail below.

BRIEF DESCRIPTION OF DRAWINGS

The above and other aspects, features, and advantages of the present disclosure will be more clearly understood from following the detailed description, taken in conjunction with the accompanying drawings, in which.

DETAILED DESCRIPTION

Figure 1:
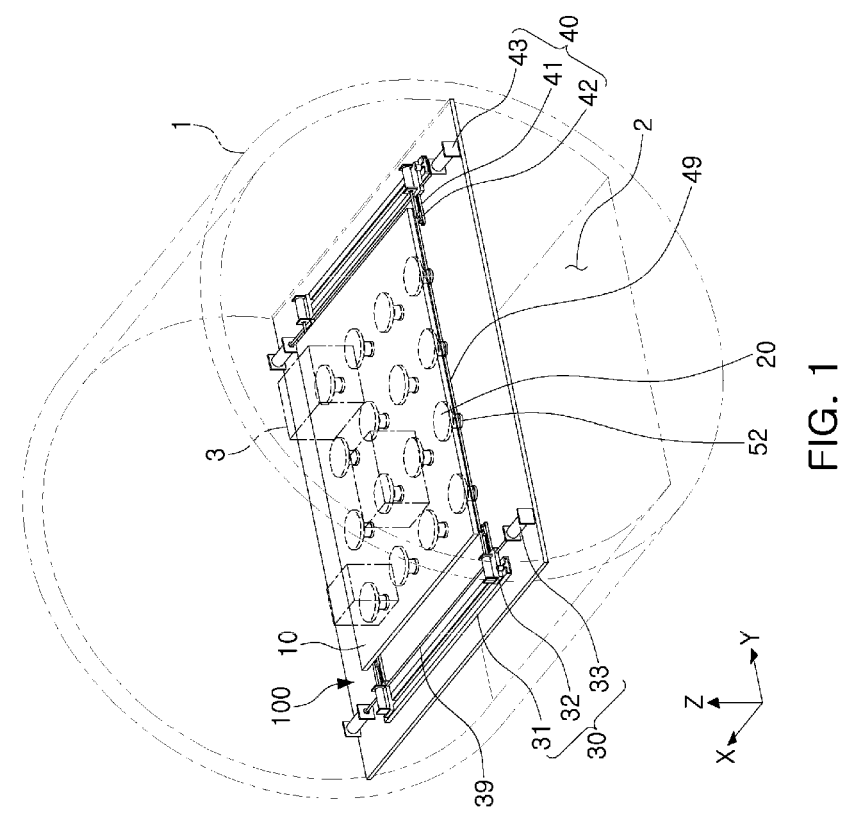
FIG. 1 is a perspective view illustrating a device for adjusting a center of gravity according to the present disclosure.

Hereinafter, the present disclosure will be described in detail with reference to the accompanying drawings. In adding reference numerals to elements of each of the drawings, although the same elements are illustrated in other drawings, like reference numerals may refer to like elements.

In the present specification, an aircraft may refer to a mobility vehicle configured to fly and move through the air. In other words, the aircraft may refer to a rotorcraft, a drone, a tilt rotor aircraft, a vertical take-off and landing aircraft, a fixed-wing aircraft, and the like, and may also include a vehicle that may land on the ground or at an apron using landing gear, after the flight. The aircraft may also include a manned aircraft and an unmanned aircraft. The manned aircraft may include a fuselage that can operate by autonomous flight in addition to a fuselage controlled by a pilot.

For convenience of explanation, the present disclosure is described as an example applied to an aircraft having a cargo hold, but the present disclosure is not necessarily limited thereto. The present disclosure may be applied to, for example, a land mobility vehicle, a marine mobility vehicle, or any other vehicle and/or mobile robot, such as an autonomous vehicle.

In addition, the terms such as "first," "second," and the like may be used to describe various components. However, the terms do not limit order, size, position, importance, and the like of components, and are used only to distinguish a component from another component.

Figure 2:
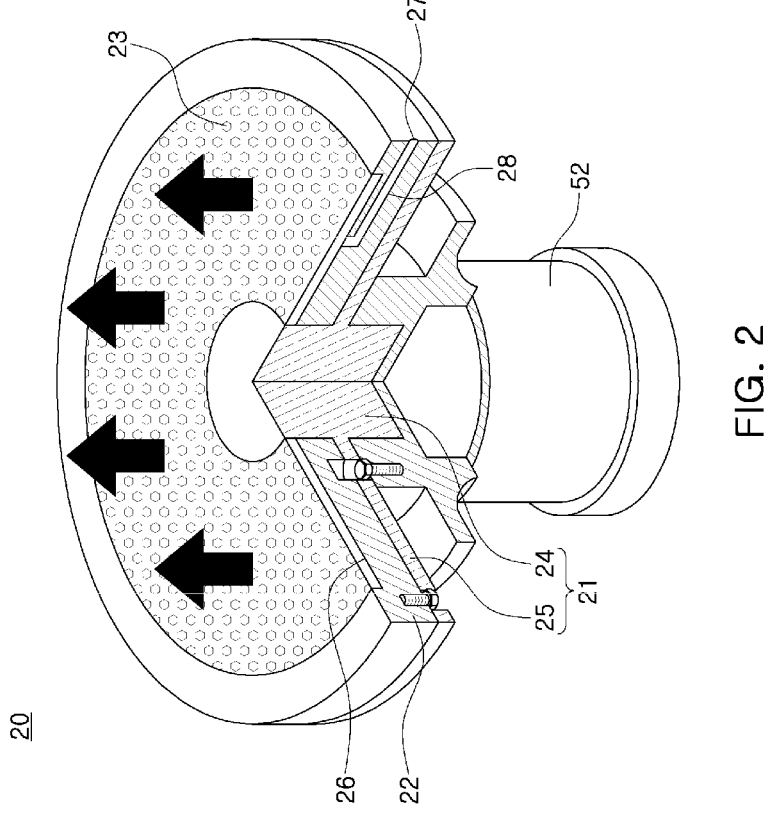
FIG. 2 is an enlarged perspective view illustrating an air bearing with a portion thereof cutaway.
Figure 3:
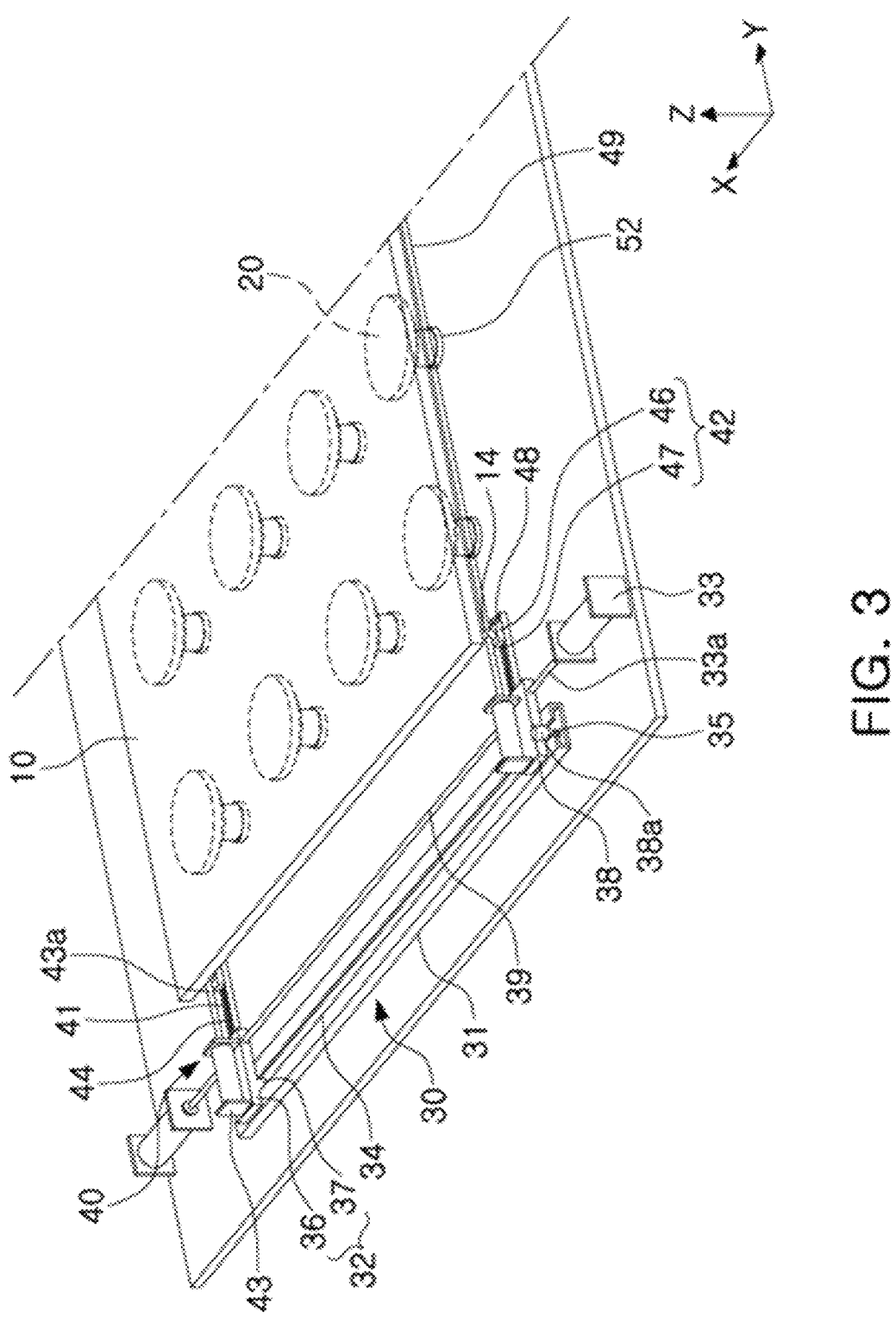
FIG. 3 is an enlarged perspective view illustrating a portion of a driving unit.

FIG. 1 is a perspective view illustrating a device for adjusting a center of gravity according to the present disclosure. FIG. 2 is an enlarged perspective view illustrating an air bearing with a portion thereof cutaway, and FIG. 3 is an enlarged perspective view illustrating a portion of a driving unit.

A device for adjusting a center of gravity 100 according to an example of the present disclosure may include a movable plate 10, a plurality of air bearings 20, and a first driving unit 30.

An aircraft 1 to which the device for adjusting a center of gravity 100 according to an example of the present disclosure is applicable may have a cargo hold 2 for loading a cargo 3. The cargo hold may be accessible from at least one of a left side, a right side, a rear side, or a front side of the aircraft. The cargo hold may accommodate a cargo.

A door (not illustrated) may be provided on one side surface of the aircraft 1 to correspond to the cargo hold 2. Such a door may adopt a sliding door opened and closed in a longitudinal direction (e.g., X-direction) of the aircraft. However, a shape of the door is not necessarily limited thereto, and a door that opens and closes by sliding vertically and/or a hinged door may be used.

The aircraft 1 may be equipped with a plurality of landing gears 5 and 6 in a lower portion thereof in order to support or move a fuselage of the aircraft on the ground or at an apron. For example, wheels may be adopted as landing gears, but the present disclosure is not necessarily limited thereto. A first load sensor 51 (see FIG. 4) for measuring a total weight of the aircraft may be installed on the aircraft (e.g., on and/or in one or more of the landing gear).

Furthermore, the aircraft 1 may include a plurality of wings and/or one or more rotors (e.g., provided in the fuselage). For example, the plurality of rotors may be provided for vertical take-off and/or landing and/or horizontal flight of the aircraft.

The movable plate 10 may be a substantially plate-shaped member, and/or may be spaced apart from a bottom and/or one or more (e.g., both) sidewalls of the cargo hold 2 of the aircraft 1. The movable plate 10 may be configured to move in at least one of the longitudinal direction (e.g., X-direction) and/or a width direction (e.g., Y-direction) of the aircraft in the cargo hold 2.

The movable plate 10 may be formed of, for example, a solid material such as metal, or the like, and may have a predetermined thickness and/or strength sufficient to support a load of cargo 3.

In order to fix the cargo 3, one or more lashing grooves (not illustrated) may be provided in and/or formed in the movable plate 10. The lashing grooves may be configured to accommodate one or more lashing tools such as ropes, wires, chains, and the like.

A plurality of air bearings 20 may be arranged between the movable plate 10 and the bottom of the cargo hold 2 to support and/or float the movable plate 10. Each of the plurality of air bearings 20 may include a mounting bracket 21, a support plate 22, and/or a porous plate 23.

The mounting bracket 21 may be a member for supporting components of the air bearing 20, and/or may include a pillar portion 24 and/or a flange 25 radially extending from the pillar portion 24.

The mounting bracket 21 may be coupled to a second load sensor 52. Specifically, the mounting bracket 21 may form an integrated assembly by connecting the support plate 22 and/or the second load sensor 52. For example, the flange 25 may be coupled to the second load sensor 52 by a bolt.

One or more load cells may be adopted as the second load sensor 52, but the present disclosure is not necessarily limited thereto. The second load sensor 52 may be disposed between the movable plate 10 and the bottom of the cargo hold 2 and/or between the mounting bracket 21 of the air bearing 20 and the bottom of the cargo hold 2. The second load sensor 52 may thus be configured to directly measure and/or recognize the load of the cargo 3 on the movable plate. Furthermore, the load of the cargo 3 may be monitored in real-time by the second load sensor 52.

The support plate 22 may have a predetermined thickness, and/or may be formed as a ring-shaped disk in which a hole through which the pillar portion 24 of the mounting bracket 21 penetrates is provided in a center thereof, and/or may be coupled to the mounting bracket. A seating groove 26 into which the porous plate 23 is inserted may be formed on an upper surface of the support plate 22.

The support plate 22 may have an air inlet 27 connected to an air compressor (not illustrated, e.g., via a tube) to receive compressed air from the air compressor on a side surface thereof. An air flow path 28 for flowing air introduced through the air inlet 27 into the seating groove 26 may be formed inside the support plate 22.

As the support plate 22 forms an uppermost end of the air bearing 20, the support plate 22 may be in contact with the movable plate 10. The support plate 22 may be configured to serve as a portion of the air bearing that supports the movable plate.

The porous plate 23 may be inserted into and mounted in the seating groove 26 of the support plate 22. The porous plate may be formed as a ring-shaped disk having a central hole through which the pillar portion 24 of the mounting bracket 21 penetrates, while having a plurality of holes with a regular structure or an irregular structure.

The porous plate 23 may form an air film having a predetermined pressure on an upper surface of the air bearing while air supplied through the air flow path 28 formed on the support plate 22 is uniformly sprayed throughout an entire upper surface of the air bearing 20.

Accordingly, the support plate 22 of the air bearing 20 may be configured to come in contact with the movable plate 10 so as to support and/or apply a force to the movable plate 10. If the movable plate needs to be moved, for example, to adjust the center of gravity of the aircraft 1, the air bearing 20 may receive compressed air to spray air having a predetermined pressure through the porous plate 23 and distribute air pressure, thus floating the movable plate 10 from the support plate 22 by a predetermined height.

Accordingly, there may be no or little friction resistance between the movable plate 10 and the air bearing 20, or the friction resistance may be minimized.

For example, approximately 15 or more air bearings 20 coupled to the second load sensor 52 may be provided between the movable plate 10 and the bottom of the cargo hold 2. The air bearings 20 may be arranged at regular intervals.

If an air compressor generating compressed air is provided on the ground or at an apron, the air compressor may be connected to an air supply unit 7 (see, e.g., FIGS. 6A-B) installed in the fuselage of the aircraft 1. The air supply unit 7 may have an electric valve (not illustrated) that may be opened and/or closed based on (e.g., in response to) electricity applied thereto. Furthermore, tubes connected to each of the plurality of air bearings 20 may be branched and installed from the air supply unit 7 installed in the fuselage.

For example, if cargo 3 is loaded and/or unloaded into an aircraft 1 (e.g., at a departure point and/or an intermediate stop), the air compressor may be connected to the air supply unit 7 of the fuselage of the aircraft via a main tube. The compressed air generated by the air compressor may be supplied from the air supply unit 7 to the air bearing 20 via the tube to operate the air bearing.

A regulator (not illustrated) for controlling the air pressure of the compressed air and/or supplying the air to the air bearing may be disposed between the air bearing 20 and the air supply unit 7 of the fuselage.

Various regulators controlling air pressure are proposed and known, so detailed descriptions of the configuration and operation of the regulator are omitted in the present specification. Any regulator that can provide air pressure to float the movable plate 10 and the cargo 3 disposed thereon may be adopted.

The first driving unit 30 may be installed on the bottom of the cargo hold 2 and may be configured to move the movable plate 10 in one of the longitudinal direction (e.g., X-direction) and/or the width direction (e.g., Y-direction) of the aircraft 1. To this end, a pair of first driving units may be provided so that they may be disposed on both sides of the movable plate 10.

The first driving unit 30 may include a first rail 31, a first slider 32, and/or a first actuator 33.

The first rail 31 may extend and/or be disposed in a first direction from the bottom of the cargo hold 2. For example, the first direction may be parallel to the longitudinal direction (e.g., X-direction) of the aircraft 1 or the cargo hold 2. The first rail may be formed of a solid material such as metal, plastic, or the like. The first rail may include a groove portion 34 formed to extend in the longitudinal direction of the first rail.

A plurality of locking holes 35 may be formed on the bottom or one sidewall of the groove portion 34. The plurality of locking holes may be arranged to be spaced apart from each other at intervals in a longitudinal direction of the first rail 31.

The first rail 31 may serve to guide the movement of the movable plate 10, together with the first slider 32.

The first slider 32 may be inserted into an interior of the first rail 31. The groove portion 34 of the first rail 31, and/or may reciprocate and slide in the longitudinal direction of the first rail 31 within the groove portion 34 of the first rail. Furthermore, the first slider 32 may be directly and/or indirectly connected to the movable plate 10.

The first slider 32 may have a cross-sectional shape corresponding to the groove portion 34 of the first rail 31. For example, the first slider 32 may be formed to have a substantially T-shaped or inverted L-shaped cross-section. Accordingly, the first slider 32 may include a flat mounting portion 36 and/or an insertion portion 37. The insertion portion 37 may be connected orthogonally to the mounting portion 36 and configured to be inserted into the groove portion 34.

A first locker 38 for controlling a movement of the first slider 32 may be mounted on one side of the mounting portion 36. As the first locker 38, a hydraulic cylinder such as a pneumatic cylinder, or an electric actuator such as a solenoid actuator, which is equipped with an operating rod 38a, may be adopted.

For example, the first locker 38 may be disposed so that an extension and retraction direction of the operating rod 38a may be perpendicular to the moving direction of the first slider 32 and the longitudinal direction of the first rail 31.

Accordingly, if the operating rod 38a of the first locker 38 is extended (e.g., expanded, lengthened, protruded, etc.) an end of the operating rod 38a may extend to be inserted into (e.g., protrude into) one of the locking holes 35 of the first rail 31, thus preventing the movement of the first slider 32 and fixedly determining a position of the first slider 32 to the first rail 31. If the operating rod 38a is retracted (e.g., contracted, shortened, etc.), the operating rod 38a may be removed from and/or not protrude into any one of the locking holes 35, such that the first slider 32 may slide on the first rail 31 without interference by a driving force of the first actuator 33.

Here, the configuration of the first locker 38 and an arrangement relationship of the first locker 38 and the locking hole 35 are not limited to the aforementioned example. If the position of the first slider 32 on the first rail 31 may be fixed or the fixing thereof may be released, the present disclosure may have any other configuration and an appropriate arrangement relationship therebetween.

An operating rod 33a of the first actuator 33 may be connected to the mounting portion 36. As the first actuator 33, a hydraulic cylinder such as a pneumatic cylinder, or an electric actuator such as a solenoid actuator, which is equipped with the operating rod, may be adopted. Alternatively, an electric linear actuator that can determine the position of the operating rod screw-fastened to a ball screw with high precision, by rotating the ball screw in a case using a stepping motor mounted in one side of the case may be adopted as the first actuator 33.

The movable plate 10 may be fixedly connected to the other side of the mounting portion 36. For example, in order to implement stable support and movement of the movable plate 10, a plurality of first sliders 32 may be disposed and connected to a bottom of the movable plate 10.

In this case, a plurality of first actuators 33 may be provided, and each of the first actuators 33 may be connected to the first slider 32 to provide driving force. In the plurality of first actuators, extension and retraction of the operating rods 33a disposed in both sides thereof may be reversed. That is, if the operating rod of one first actuator disposed in one side extends, the operating rod of the other first actuator disposed in the opposite side retracts.

The first driving unit 30 may further include a first connection member 39 for connecting the plurality of first sliders 32. The first connection member 39 may be formed of a substantially rod-shaped or tubular member. Accordingly, the plurality of first sliders 32 may simultaneously move along the first rail 31 in the same direction.

Accordingly, in a state in which the movable plate 10 is floated from the air bearing 20 by a predetermined height, the first actuator 33 of the first driving unit 30 may operate to extend and/or retract the operating rod 33a, thus moving the movable plate 10 connected to the first slider 32 in the first direction along the first rail 31.

The movable plate 10 may be moved in the longitudinal direction (e.g., X-direction) of the aircraft 1, for example, within a range of ±300 mm, that is, a total range of 600 mm. To this end, the first rail 31 and the operating rod of the first actuator 33 may have a length of approximately 600 mm or more.

The device for adjusting a center of gravity 100 according to the present disclosure may further include a second driving unit 40 interposed between the movable plate 10 and the first driving unit 30 to move the movable plate 10 in one of the longitudinal direction (e.g., X-direction) and width direction (e.g., Y-direction) of the aircraft 1.

The second driving unit 40 may be disposed on the first slider 32 of the first driving unit 30, and between the first slider 32 and the movable plate 10. Furthermore, a pair of second driving units 40 may be provided so that they may be disposed in both sides of the movable plate 10.

The second driving unit 40 may include a second rail 41, a second slider 42, and a second actuator 43.

The second rail 41 may be connected to the other side of the mounting portion 36 of the first slider 32 in a cantilever shape, and may extend and be disposed in a second direction. For example, the second direction may be parallel to the width direction (e.g., Y-direction) of the aircraft 1 or the cargo hold 2. The second rail 41 may be formed of a solid material such as metal, plastic, or the like. The second rail 41 may include a groove portion 44 formed to extend in a longitudinal direction of the second rail 41.

A plurality of locking holes (not illustrated) arranged to be spaced apart from each other at intervals in the longitudinal direction of the second rail 41 may be formed on a bottom or one sidewall of the groove portion 44.

The second rail 41 may serve to guide the movement of the movable plate 10, together with a plurality of second sliders 42.

The second slider 42 may be inserted into an interior of the second rail 41, that is, the groove portion 44 of the second rail 41, and may reciprocate and slide in the longitudinal direction of the second rail within the groove portion of the second rail 41. Furthermore, the second slider 42 may be directly or indirectly connected to the movable plate 10.

The second slider 42 may have a cross-sectional shape corresponding to the groove portion 44 of the second rail 41. For example, the second slider 42 may be formed to have a substantially T-shaped cross-section. Accordingly, the second slider 42 may include a flat mounting portion 46 and an insertion portion 47 connected to be orthogonal to the mounting portion 46 and inserted into the groove portion 44.

A second locker 48 for controlling a movement of the second slider 42 may be mounted in one side of the mounting portion 46. As the second locker, a hydraulic cylinder such as a pneumatic cylinder, or an electric actuator such as a solenoid actuator, which is equipped with an operating rod, may be adopted.

For example, the second locker 48 may be disposed so that an extension and retraction direction of the operating rod may be perpendicular to the movement direction of the second slider 42 and the longitudinal direction of the second rail 41.

Accordingly, if the operating rod of the second locker 48 is extended, an end of the operating rod may be inserted into one of the locking holes of the second rail 41, thus preventing the movement of the second slider 42 and fixedly determining a position of the second slider to the second rail. If the operating rod is retracted, the second slider may slide on the second rail 41 without interference by driving force of the second actuator 43.

Here, the configuration of the second locker 48 and an arrangement relationship between the second locker 48 and the locking hole are not limited to the aforementioned example. If the position of the second slider 42 on the second rail 41 may be fixed or the fixing thereof may be released, the present disclosure may have any other configuration and an appropriate arrangement relationship therebetween.

The operating rod 43a of the second actuator 43 may be connected to the mounting portion 46 via a support portion 14 (e.g., a support) and/or directly. As the second actuator, a hydraulic cylinder such as a pneumatic cylinder, or an electric actuator such as a solenoid actuator, which is equipped with an operating rod, may be adopted. Alternatively, an electric linear actuator that can determine the position of the operating rod screw-fastened to a ball screw with high precision, by rotating the ball screw in a case using a stepping motor mounted on one side of the case may be adopted as a second actuator 43.

Furthermore, the mounting portion 46 of the second slider 42 and the movable plate 10 may be fixedly connected via the support portion 14. To this end, welding or bolting may perform a connection between the support portion 14 and the mounting portion 46 and a connection between the support portion 14 and the movable plate 10.

If the support portion 14 is provided, the operating rod 43a of the second actuator 43 may be connected to the support portion 14. The welding or the bolting may perform a connection between the support portion 14 and the operating rod 43a of the second actuator 43.

For example, in order to implement stable support and movement of the movable plate 10, a plurality of second sliders 42 may be connected to the bottom of the movable plate 10 through the support portion 14.

In this case, the device for adjusting a center of gravity 100 of the present disclosure may include a plurality of first driving units 30, and each of the plurality of first driving units may include a second driving unit 40. Each of the second driving units 40 disposed in one side of the movable plate 10 may be equipped with a second actuator 43, and the second actuator may provide driving force to the second slider 42 connected to the movable plate 10.

In a plurality of second actuators 43 disposed in one side of the movable plate 10, extension and retraction of the operating rod 43a disposed on both sides may be reversed. That is, if the operating rod of one second actuator disposed on one side extends, the operating rod of the other second actuator disposed on the opposite side retracts.

The device for adjusting a center of gravity 100 of the present disclosure may further include a second connection member 49 for connecting the plurality of second sliders 42 disposed on one side of the movable plate 10. The second connection member 49 may be formed of a substantially rod-shaped or tubular member. Accordingly, the plurality of second sliders 42 may simultaneously move along the second rail 41 in the same direction.

Accordingly, in a state in which the movable plate 10 is floated from the air bearing 20 by a predetermined height, the second actuator 43 of the second driving unit 40 may operate to extend or retract the operating rod 43a, thus moving the movable plate 10 connected to the second slider 42 in the second direction along the second rail 41.

The movable plate 10 may be moved in the width direction (e.g., Y-direction) of the aircraft 1, for example, within a range of ±120 mm, that is, total range of 240 mm. To this end, the second rail 41 and the operating rod 43a of the second actuator 43 may have a length of approximately 240 mm or more.

Hereinafter, an operation of the device for adjusting a center of gravity 100 according to the present disclosure will be briefly described.

If a position of the cargo 3 is required to be moved, an electric valve of the air supply unit 7 may be opened to drive the air bearing 20, thus supplying compressed air generated by the air compressor from the air supply unit to the air bearing 20 through the tube.

By spraying air having a predetermined pressure through the porous plate 23 of the air bearing 20, the movable plate 10 may be floated from the support plate 22 of the air bearing 20 by a predetermined height. Air pressure for floating the movable plate 10 may be adjusted using a regulator. Accordingly, there may be no friction resistance between the movable plate 10 and the air bearing 20, or the friction resistance may be minimized.

In this state, the first locker 38 of the first driving unit 30 may be released, and the first slider 32 may slide along the first rail 31 in the first direction by a predetermined amount of movement without interference by the driving force of the first actuator 33.

If the second driving unit 40 is provided, the second driving unit and the movable plate 10 connected thereto may also move in the first direction along the first rail 31 together with the movement of the first slider 32.

If the first locker 38 of the first driving unit 30 is operated after the movement of the first slider 32 is completed, the position of the first slider 32 with respect to the first rail 31 may be fixed. Accordingly, the position of the movable plate 10 and the cargo 3 disposed thereon may be moved and changed in the first direction.

In this state, if the second driving unit 40 is provided, the second locker 48 of the second driving unit 40 may be released, and the second slider 42 may slide along the second rail 41 in the second direction by a predetermined amount of movement without interference by the driving force of the second actuator 43.

The movable plate 10 may also move in the second direction along the second rail 41 together with the movement of the second slider 42.

If the second locker 48 of the second driving unit 40 is operated after the movement of the second slider 42 is completed, the position of the second slider 42 with respect to the second rail 41 may be fixed. Accordingly, the position of the movable plate 10 and the cargo 3 disposed thereon may be moved and changed in the second direction.

As described above, in the device for adjusting a center of gravity 100 according to the present disclosure, the position of the movable plate 10 may be moved in the longitudinal direction (e.g., X-direction) and/or the width direction (e.g., Y-direction) of the aircraft 1, and the positions of the cargo 3 may be quickly and easily adjusted due to the movement of the movable plate 10.

Therefore, according to the device for adjusting a center of gravity according to the present disclosure, the load of the cargo may be measured in real time to accurately adjust the center of gravity, and the movement of the movable plate through the air bearing and the driving unit in the cargo hold may enable detailed adjustment of the position of the cargo.

Furthermore, according to the device for adjusting a center of gravity according to the present disclosure, cargo of various shapes and sizes may be loaded in the cargo hold, and a high degree of freedom may be assigned to the location selection of each cargo.

Furthermore, according to the device for adjusting a center of gravity according to the present disclosure, after setting a position of initial cargo, the center of gravity may be automatically adjusted at intermediate stops, thereby reducing transportation time of the cargo.

Figure 4:
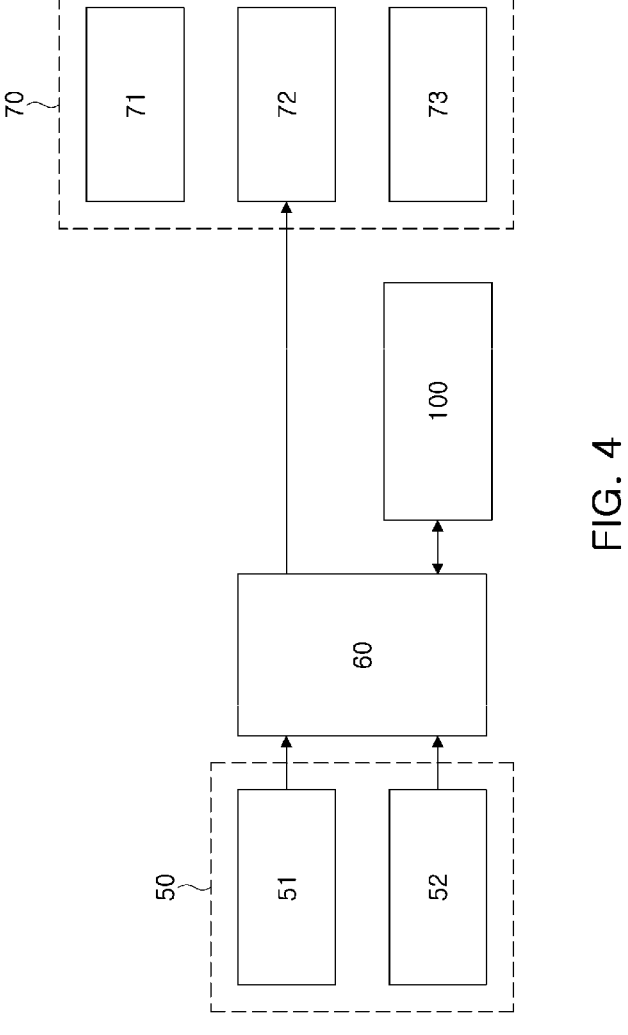
FIG. 4 is a schematic block diagram illustrating a system for loading and unloading a cargo using the device for adjusting a center of gravity according to the present disclosure.

FIG. 4 is a schematic block diagram illustrating a system for loading and unloading a cargo using the device for adjusting a center of gravity according to the present disclosure.

The system for loading and unloading a cargo according to the present disclosure may include a sensing unit 50, a controller 60, and a device for adjusting a center of gravity 100.

The sensing unit 50 may include a first load sensor 51 installed in landing gears 5 and 6 to measure a total weight of the aircraft 1, and a second load sensor 52 disposed between the movable plate 10 of the device for adjusting a center of gravity 100 and the bottom of the cargo hold 2 to measure the load of cargo 3. The sensing unit may be electrically connected to the controller 60 using wired communication, wireless communication, or wired and wireless communication.

The first load sensor 51 may measure a vertical load applied to the landing gears 5 and 6, and may provide information for measuring the total weight of the aircraft 1 and calculating a position of the center of gravity, to the controller 60.

Here, the total weight of the aircraft 1 refers to the sum of a weight of passengers, a weight of the cargo 3, and the like, together with an aircraft's own weight.

The first load sensor 51 for measuring the total weight of the aircraft 1 may be installed in a nose landing gear 5 disposed in the front of the aircraft 1, and a main landing gear 6 disposed in the middle of the aircraft, respectively. The first load sensor may measure a load applied by being distributed to the nose landing gear and the main landing gear, thus obtaining the total weight of the aircraft 1 by performing calculation by the controller 60.

A load cell may be adopted as the first load sensor 51, but the present disclosure is not necessarily limited thereto, and at least one of any pressure sensor, any acceleration sensor, and any displacement sensor may be adopted as long as they are installed in the landing gears 5 and 6 to measure the total weight of the aircraft 1.

As described above, the second load sensor 52 may be provided between the movable plate 10 and the bottom of the cargo hold 2, thereby directly measuring and recognizing the weights of the cargo 3 disposed on the movable plate 10, that is, the load of the cargo.

The second load sensor 52 may be coupled to the mounting bracket 21 of the air bearing 20 to form an assembly integrated with the air bearing, but the present disclosure is not necessarily limited thereto.

The controller 60 may calculate and compare the center of gravity of the aircraft 1 using information obtained from the sensing unit 50, or the like, and control driving of the device for adjusting a center of gravity 100 to adjust the center of gravity.

The controller 60 may be implemented with various processing devices such as a microprocessor in which a semiconductor chip and a memory capable of performing various operations or instructions is embedded. Furthermore, programs for performing various operations or instructions may be installed in advance in the controller. By a program, for example, a center of gravity tolerance range and the actual center of gravity of the aircraft 1 may be calculated and compared to determine whether the actual center of gravity is within the center of gravity tolerance range.

For example, if the total weight of the aircraft 1 changes, e.g., due to the loading and/or unloading of the cargo 3, the controller 60 may measure the total weight of the aircraft 1 based on the information obtained from the first load sensor 51. Furthermore, based on total weight information, the controller 60 may assume density by reflecting a previously input shape of the aircraft, and may define corresponding coordinates by calculating the actual center of gravity.

The controller 60 may determine a preset center of gravity tolerance range for each aircraft with respect to the measured total weight of the aircraft, and may compare the actual center of gravity with a determined center of gravity tolerance range, thus determining whether the actual center of gravity is within a corresponding center of gravity tolerance range. As a result of the determination, if the actual center of gravity is within the center of gravity tolerance range, the controller 60 may provide information of the center of gravity to an upper control system 70 of the aircraft 1.

Furthermore, if the actual center of gravity deviates from the center of gravity tolerance range and the position of the cargo 3 needs to be moved, the controller 60 may measure a load caused by loading and unloading or changing the cargo 3, by the information obtained using the second load sensor 52, and may calculate a volume by an input cargo size. Accordingly, the controller 60 may calculate and determine the amount of movement of the cargo 3 so that the actual center of gravity is within the center of gravity tolerance range, by reflecting a measured load distribution of the cargo.

The example described and illustrated with reference to FIGS. 1 to 3 may be adopted as the device for adjusting a center of gravity 100.

For example, approximately 15 or more air bearings 20 coupled to the second load sensor 52 may be provided between the movable plate 10 and the bottom of the cargo hold 2 and may be arranged at regular intervals.

Furthermore, the first driving unit 30 may be provided in pairs, and the second driving unit 40 may be provided in pairs for each of the first driving units 30, thereby stably supporting and smoothly moving the movable plate 10 and the cargo 3.

The controller 60 may be electrically connected to the first actuator 33, the first locker 38, the second actuator 43, the second locker 48, the electric valve of the air supply unit 7, and the like, in the device for adjusting a center of gravity 100, using wired communication, wireless communication, or wired and wireless communication, and may control their operation.

If the actual center of gravity of the aircraft is confirmed to deviate from the center of gravity tolerance range, the controller 60 may control the electric valve of the air supply unit 7 or the air compressor to drive the air bearing 20 of the device for adjusting a center of gravity 100 through the communication. Accordingly, air having a predetermined pressure may be sprayed through the porous plate 23 of the air bearing, thereby floating the movable plate 10 from the support plate 22 of the air bearing by a predetermined height.

Then, the controller 60 may control an operation of the first actuator 33 and/or the second actuator 43 so as to move the position of the movable plate 10 by a determined amount of movement by driving the first driving unit 30 and/or the second driving unit 40. Accordingly, the position of the movable plate 10 may be moved in the longitudinal direction (e.g., X-direction) and/or the width direction (e.g., Y-direction) of the aircraft 1, and the position of the cargo 3 may be adjusted due to the movement of the movable plate 10.

Furthermore, the controller 60 may repeatedly accumulate and update the calculated center of gravity of the aircraft 1 and the amount of movement of the movable plate 10 for matching the center of gravity. Accordingly, the controller 60 may learn the center of gravity of the aircraft 1 and the amount of movement of the movable plate 10 according to the load and the disposition of the cargo 3.

Meanwhile, the controller 60 may be merged or linked to the upper control system 70 of the aircraft 1. For example, along with various flight control units, the upper control system 70 may include a position measurement unit 71, a data storage unit 72 (e.g., a hard drive, a flash memory, or the like), a communication unit 73, and the like, thereby controlling an operation of several components required for the flight of an aircraft.

The position measurement unit 71 may measure the position of the aircraft 1 through reception of a global positioning system (GPS) signal from a satellite or sensing of an inertial navigation system (IMS), and may transmit the measured position information to the data storage unit 72.

The data storage unit 72 may store and keep various types of data collected inside and outside the aircraft 1 in the form of a database. Here, the database may refer to an organization of related data regardless of how to express data (e.g., tables, maps, grids, packets, diagrams, files, and messages).

The data storage unit 72 may store various data required for calculating the center of gravity, such as the weight and the shape of the aircraft 1, and the number of passengers, the size and the number of cargo 3, as well as input or preset flight-related information, and the total weight of the aircraft, the load of the cargo, the center of gravity, which are calculated based on these data, and the preset center of gravity tolerance range of the total weight.

Accordingly, the system for loading and unloading a cargo according to the present disclosure may adjust the center of gravity by moving the position of the cargo according to the load and the arrangement, thereby optimizing the control stability of the aircraft.

The communication unit 73 may be accessible, using, for example, at least one of wired communication, wireless communication, and wired and wireless communication. The upper control system 70 may communicate with and control various components in the aircraft 1 using wireless communication, such as a communication network using a controller area network (CAN) protocol.

For example, the communication unit 73 may communicate with an interface of a user outside the aircraft 1, which may enable the user to monitor various data required for calculating the center of gravity, and the total weight of the aircraft, the load of cargo and the center of gravity, which are calculated based on these data, in real time.

Figure 5:
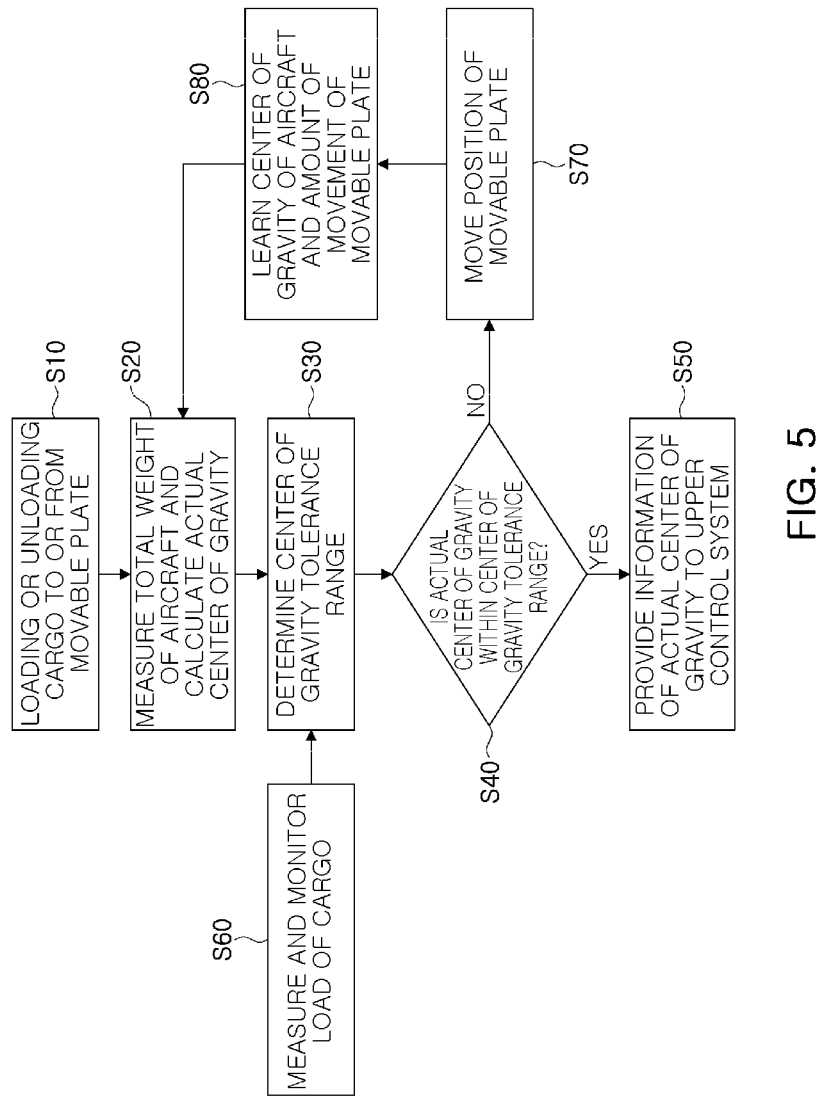
FIG. 5 is a flowchart illustrating a method for loading and unloading a cargo using the device for adjusting a center of gravity according to the present disclosure.
Figure 6A:
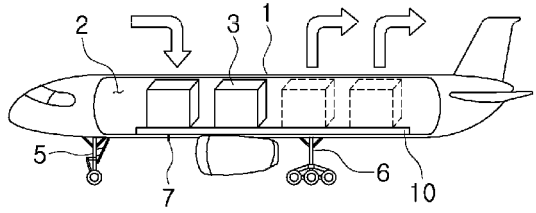
FIG. 6A and FIG. 6B illustrate a method for loading and unloading a cargo using the device for adjusting a center of gravity according to the present disclosure.
Figure 6B:
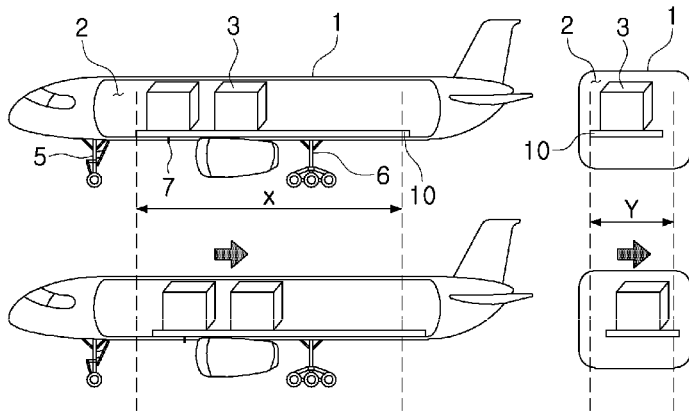

FIG. 5 is a flowchart illustrating a method for loading and unloading a cargo using a device for adjusting a center of gravity according to the present disclosure, and FIGS. 6A and 6B show a method for loading and unloading a cargo using the device for adjusting a center of gravity according to the present disclosure.

The method for loading and unloading a cargo according to the present disclosure may be initiated by an operation of loading a cargo 3 to a movable plate 10 of a device for adjusting a center of gravity 100 in a cargo hold 2 of an aircraft 1 and/or unloading the cargo from the movable plate 10 (S10).

As illustrated in FIG. 6A, loading of the cargo 3 may be performed at a departure point or an intermediate stop of the aircraft 1. Unloading of the cargo 3 may be performed at the intermediate stop. Accordingly, the method for loading and unloading a cargo according to the present disclosure may be performed if the aircraft has landed on the ground at the departure point or the intermediate stop.

In this case, an air compressor for generating compressed air may be connected to an air supply unit 7 installed on a fuselage of the aircraft 1. The air supply unit 7 may have an electric valve that can be opened and/or closed based on electricity being applied.

If the loading of the cargo 3 is completed, the first load sensor 51 of the sensing unit 50 may measure the total weight of the aircraft 1. Based on the measurement or simultaneously with the measurement, the first load sensor 51 may transmit information for calculating a position of the center of gravity, that is, total weight information of the aircraft, to the controller 60.

Based on the total weight information, the controller 60 may assume density by reflecting a previously input shape of the aircraft 1, and define corresponding coordinates by calculating the center of gravity (S20).

Furthermore, if the loading of the cargo 3 is completed, the second load sensor 52 of the sensing unit 50 may measure and monitor the loads of the cargo 3 disposed on the movable plate 10. After the measurement or simultaneously with measurement, the second load sensor 52 may transmit load information of cargo to the controller 60 (S60).

Next, the controller 60 may determine a preset center of gravity tolerance range for each aircraft with respect to the measured total weight of the aircraft 1 (S30).

The controller 60 may determine whether the actual center of gravity is within a corresponding center of gravity tolerance range by comparing the actual center of gravity with the determined center of gravity tolerance range (S40).

As a result of the determination, if the actual center of gravity is within the center of gravity tolerance range, the controller 60 may provide information of the actual center of gravity to the upper control system 70 of the aircraft 1 (S50). Then, the upper control system 70 may control the aircraft 1 to prepare for take-off and flight, and the aircraft may start the take-off.

The upper control system 70 may store various data required for calculating the center of gravity, such as the weight and the shape of the aircraft 1, the number of passengers, and the size and the number of cargo 3, as well as input or preset flight-related information, and the total weight of the aircraft, the load of the cargo, the center of gravity, which are calculated based on these data, and the preset center of gravity tolerance range of the total weight.

If the actual center of gravity is confirmed to deviate from the center of gravity tolerance range, the controller 60 may calculate and determine the amount of movement of the movable plate 10 so that the actual center of gravity is within the center of gravity tolerance range, by reflecting a measured load distribution of the cargo.

Furthermore, the controller 60 may control the electric valve of the air supply unit 7 or the air compressor to drive the air bearing 20 of the device for adjusting a center of gravity 100 through communication. Accordingly, air having a predetermined pressure may be sprayed from the air bearing 20, thereby floating the movable plate 10 from the air bearing 20 by a predetermined height.

Then, the controller 60 may drive the first driving unit 30 and/or the second driving unit 40 to move the position of the movable plate 10 by the determined amount of movement (S70).

Accordingly, as illustrated in FIG. 6B, the position of the movable plate 10 may be moved in the longitudinal direction (e.g., X-direction) and/or the width direction (e.g., Y-direction) of the aircraft 1, and/or the position of the cargo 3 may be adjusted due to the movement of the movable plate 10.

For example, as shown in FIG. 6A, after the loading of the cargo 3 is completed, 40% of the total weight of the aircraft 1 may be applied to the nose landing gear 5, and the remaining 60% of the load may be applied to the main landing gear 6.

As illustrated in FIG. 6A, after the movement of the movable plate 10 is completed, a load of half the total weight of the aircraft 1 may be distributed and applied to the nose landing gear 5 and the main landing gear 6, respectively.

In other words, the load distributed to the nose landing gear 5 and the main landing gear 6 may be changed according to the movement of the movable plate 10 and the cargo 3.

In the controller 60, the calculated center of gravity of the aircraft 1 and the amount of movement of the movable plate 10 for matching the center of gravity may be repeatedly accumulated and updated. Accordingly, the controller 60 may learn the center of gravity of the aircraft 1 and the amount of movement of the movable plate 10 according to the load and the arrangement of the cargo 3 (S80).

After the movement of the movable plate 10 and the cargo 3 is completed, the controller 60 may proceed with operation S20 of calculating the actual center of gravity, and subsequent operations may then be repeated.

A device for adjusting a center of gravity is provided that can measure a change and distribution of a load, learn the optimal center of gravity, and ensure control stability by easily adjusting the center of gravity and maintaining balance, for example, in an aircraft.

A device for adjusting a center of gravity may include: a movable plate configured to support a cargo, and spaced apart from a bottom and sidewalls of a cargo hold and installed to be movable within the cargo hold; a plurality of air bearings disposed between the movable plate and the bottom to support and float the movable plate; and a first driving unit installed in the cargo hold and connected to the movable plate, and moving the movable plate when the movable plate is floated.

The movable plate may be movable in at least a first direction within the cargo hold.

The air bearing may include: a mounting bracket; a support plate coupled to the mounting bracket and having a seating groove and an air flow path communicating with the seating groove formed therein; and a porous plate inserted into the seating groove, and having a plurality of holes formed therein, to spray air of a predetermined pressure supplied through the air flow path.

The support plate may include an air inlet receiving air from an air compressor, and the air flow path formed to flow the air introduced through the air inlet into the seating groove.

The mounting bracket may be coupled to a second load sensor for measuring a load of the cargo placed on the movable plate.

The first driving unit may include: a first rail extending and disposed along the first direction at the bottom of the cargo hold; and a first slider capable of reciprocating and sliding in a longitudinal direction of the first rail, and connected to the movable plate; and a first actuator having an operating rod connected to the first slider to provide driving force to the first slider.

A first locker for controlling a movement of the first slider with respect to the first rail may be mounted on the first slider.

The first locker may include an operating rod, the first rail may be provided with a plurality of locking holes arranged in a longitudinal direction of the first rail, and the operating rod of the first locker may be inserted into one of the plurality of locking holes, thus preventing the movement of the first slider.

The first driving unit may include a plurality of first sliders, the first actuators may be connected to each of the plurality of first sliders to provide driving force, and extension and retraction of at least a portion of operating rods of the plurality of first actuators may be reversed.

The first driving unit may further include a first connection member connecting the plurality of first sliders.

The device for adjusting a center of gravity may further include a second driving unit interposed between the movable plate and the first driving unit, to move the movable plate in a second direction.

The second driving unit may include: a second rail connected to the first slider, and extending and disposed in the second direction; a second slider capable of reciprocating and sliding in a longitudinal direction of the second rail, and connected to the movable plate; and a second actuator having an operating rod connected to the second slider to provide driving force to the second slider.

A second locker for controlling a movement of the second slider with respect to the second rail may be mounted on the second slider.

The second locker may include an operating rod, the second rail may be provided with a plurality of locking holes arranged in a longitudinal direction of the second rail, and the operating rod of the second locker may be inserted into one of the plurality of locking holes, thus preventing the movement of the second slider.

The device for adjusting a center of gravity may include the plurality of first driving units, each of the plurality of first driving units may include the second driving unit, and extension and retraction of at least a portion of operating rods of a plurality of second actuators disposed on one side of the movable plate may be reversed.

The device for adjusting a center of gravity may further include a second connection member connecting a plurality of second sliders disposed on one side of the movable plate.

The second slider and the movable plate may be fixedly connected to each other via a support portion, and the operating rod of the second actuator may be connected to the support portion.

As described above, in the system and the method for loading and unloading a cargo according to the present disclosure, even if an intermediate stop is included in the travel from a departure point to a destination, the center of gravity changed after unloading and/or loading the cargo may be quickly and easily adjusted, so that the aircraft may fly safely to the destination.

Furthermore, adjusting the center of gravity may be achieved via a detailed positional movement of cargo, which was conventionally difficult to perform. The load of the cargo may be measured and monitored in real-time.

As set forth above, according to the example of the present disclosure, in a system and a method for loading and unloading a cargo, the center of gravity may be accurately adjusted by measuring the load in real time, and the movement of the movable plate through the air bearing and the driving unit in the cargo hold may enable a detailed adjustment of the position of the cargo.

Furthermore, according to the example of the present disclosure, a device for adjusting a center of gravity may quickly respond to a change in a load and the center of gravity that may occur at intermediate stops, which may make it easy to redistribute a load, and furthermore, to distribute the load, the cargo can be moved while disposed on a movable plate, thereby securing control stability through smooth control of the center of gravity.

The aforementioned description merely illustrates the technical concept of the present disclosure, and a person: skilled in the art to which the present disclosure pertains may make various modifications and modifications without departing from the essential characteristics of the present disclosure.

Therefore, the examples disclosed in this specification and drawings are not intended to limit but to explain the technical concept of the present disclosure, and the scope of the technical idea of the present disclosure is not limited by these example. The scope of protection of the present disclosure should be interpreted by the following claims, and all technical ideas within the scope equivalent thereto should be interpreted as being included in the scope of the present disclosure.

What is claimed is:

1. A device comprising:
a movable plate configured to support a cargo, wherein the movable plate is spaced apart from a bottom surface of a cargo hold and is movable within the cargo hold;
a plurality of air bearings disposed between the movable plate and the bottom surface and configured to support and float the movable plate; and
a first actuator assembly connected to the movable plate, and configured to move the movable plate if the movable plate is floated,
wherein each air bearing, of the plurality of air bearings, comprises:
a mounting bracket;
a support plate coupled to the mounting bracket, wherein a seating groove is formed in the support plate and an air inlet is configured to allow air to flow into the seating groove; and
a porous plate inserted into the seating groove, wherein a plurality of holes are formed in the porous plate and are configured to output air, from the air inlet, at a predetermined pressure.

2. The device of claim 1, wherein the movable plate is movable in at least a first direction within the cargo hold.

3. The device of claim 2, wherein the first actuator assembly comprises:
a first rail extending in the first direction near the bottom surface of the cargo hold;
a first slider configured to slide along the first rail and connected to the movable plate; and
a first actuator comprising an operating rod connected to the first slider, wherein the first actuator is configured to provide a driving force, via the operating rod, to the first slider.

4. The device of claim 3, wherein a first locker, configured to control movement of the first slider with respect to the first rail, is mounted on the first slider.

5. The device of claim 4, wherein:
the first locker comprises a locking operating rod;
the first rail is provided with a plurality of locking holes arranged in a longitudinal direction of the first rail; and
the locking operating rod of the first locker is configured to be inserted into one of the plurality of locking holes to prevent movement of the first slider.

6. The device of claim 3, wherein the first actuator assembly comprises a plurality of first sliders comprising the first slider;
wherein the first actuator comprises a plurality of operating rods connected to, and configured to provide a driving force to, the plurality of first sliders; and
wherein a first portion of the plurality of operating rods are configured to extend based on a second portion of the plurality of operating rods retracting.

7. The device of claim 6, wherein the first actuator assembly further comprises a first connection member connecting the plurality of first sliders.

8. The device of claim 3, further comprising a second actuator assembly interposed between the movable plate and the first actuator assembly, wherein the second actuator assembly is configured to move the movable plate in a second direction.

9. The device of claim 8, wherein the second actuator assembly comprises:
a second rail connected to the first slider and extending in the second direction;
a second slider configured to slide along the second rail and connected to the movable plate; and
a second actuator comprising a second operating rod connected to the second slider, wherein the second actuator is configured to provide driving force, via the second operating rod, to the second slider.

10. The device of claim 9, wherein a second locker, configured to control movement of the second slider with respect to the second rail, is mounted on the second slider.

11. The device of claim 10, wherein:

the second locker comprises a second locking operating rod, the second rail is provided with a second plurality of locking holes arranged in a longitudinal direction of the second rail; and the second locking operating rod of the second locker is configured to be inserted into one of the second plurality of locking holes to prevent movement of the second slider.

12. The device of claim 9, further comprising:

a plurality of first actuator assemblies comprising the first actuator assembly; and a plurality of second actuator assemblies, comprising the second actuator assembly, wherein the plurality of second actuator assemblies comprise a plurality of second actuators; and wherein a first portion, of the plurality of second actuators, disposed on one side of the movable plate are configured to extend based on a second portion, of the plurality of second actuators, retracting.

13. The device of claim 12, further comprising a second connection member connecting a plurality of second sliders disposed on a side of the movable plate.

14. The device of claim 9, wherein the second slider and the movable plate are fixedly connected to each other via a support, and wherein the operating rod of the second actuator is connected to the support.

15. The device of claim 1, wherein the air inlet is configured to receive air from an air compressor and to introduce the air into the seating groove.

16. The device of claim 1, wherein the mounting bracket is coupled to a load sensor configured to measure a load of the cargo placed on the movable plate.

17. A device comprising:

a movable plate configured to support a cargo, wherein the movable plate is spaced apart from a bottom surface of a cargo hold and is movable in at least a first direction within the cargo hold;

a plurality of air bearings disposed between the movable plate and the bottom surface and configured to support and float the movable plate; and a first actuator assembly connected to the movable plate, and configured to move the movable plate if the movable plate is floated, wherein the first actuator assembly comprises:

a first rail extending in the first direction near the bottom surface of the cargo hold;

a first slider configured to slide along the first rail and connected to the movable plate; and a first actuator comprising an operating rod connected to the first slider, wherein the first actuator is configured to provide a driving force, via the operating rod, to the first slider.

18. The device of claim 17, wherein a first locker, configured to control movement of the first slider with respect to the first rail, is mounted on the first slider.

19. The device of claim 17, wherein the first actuator assembly comprises a plurality of first sliders comprising the first slider;

wherein the first actuator comprises a plurality of operating rods connected to, and configured to provide a driving force to, the plurality of first sliders; and wherein a first portion of the plurality of operating rods are configured to extend based on a second portion of the plurality of operating rods retracting.

20. The device of claim 17, further comprising a second actuator assembly interposed between the movable plate and the first actuator assembly, wherein the second actuator assembly is configured to move the movable plate in a second direction.

* * * * *